Jan. 28, 1936.                C. ADLER, JR                2,029,211
                                 SIGNAL
                          Filed June 1, 1932            7 Sheets-Sheet 1

Inventor
Charles Adler, Jr.

Attorneys

Jan. 28, 1936.  C. ADLER, JR  2,029,211
SIGNAL
Filed June 1, 1932  7 Sheets-Sheet 2

Inventor
Charles Adler, Jr.
By Cushman, Byant, Darby & Cushman
Attorneys

Jan. 28, 1936.  C. ADLER, JR  2,029,211
SIGNAL
Filed June 1, 1932  7 Sheets-Sheet 3

Inventor
Charles Adler Jr.

By Cushman, Byrd, Darby & Cushman
Attorneys

Jan. 28, 1936. C. ADLER, JR 2,029,211
SIGNAL
Filed June 1, 1932 7 Sheets-Sheet 4

Inventor
Charles Adler Jr.
By Cushman, Myers, Darby & Cushman
Attorneys

Patented Jan. 28, 1936

2,029,211

UNITED STATES PATENT OFFICE 2,029,211

SIGNAL

Charles Adler, Jr., Baltimore, Md.

Application June 1, 1932, Serial No. 614,818

4 Claims. (Cl. 177—329)

My invention relates to signals and more particularly signals applicable for railroad and for street traffic control, although it will be understood that the invention may be practiced under other conditions, as for example in hospital signal systems and hotel indicators.

The primary purpose of the present invention is to incorporate in a signal, a safety factor, that is to say, a means whereby an indication of a partial failure will be given before a complete failure of the signal takes place, and such partial failure will be indicated to an observer while at the same time an operative signal indication will be maintained. In such a construction it is vital that the signal area be intensely and completely illuminated not only prior to a partial failure but of equal importance thereafter. Therefore, I have discovered that by providing a signal having a reflector and a corrugated lens, that these elements will cooperate with each other and with the lighting means or filament in such a manner as to result in a maximum of the beams of light being directed or bent so that they emerge from the lens in substantially horizontal relation.

At the present time, and particularly with railroad and traffic signals, should the electric lamp be extinguished by the burning out of a filament, the indication entirely fails, sometimes resulting in serious accidents and this hazard is appreciated by all those in any way associated with signaling.

It is known to utilize in railway signals a plurality of filaments so that when one burns out, the other will still remain incandescent. Such a system, however, has not corrected the situation entirely because the remaining filament will continue to display the signal. The failure of one filament is not appreciably noticeable and there is opportunity for the failure to go unnoticed, with the result of a complete lamp outage.

The invention is distinguished from ordinary headlights for automobiles and other illuminating systems, in that it, of course, is a signal construction utilizing a colored signal area or glass and is not concerned with any dimming or cutting in and out of lamp filaments of more or less varying intensity.

With the present invention, the optical system and colored signal area may consist of a lens; of a combination of lenses, as well as a colored cover-glass and reflector. I prefer to employ a corrugated lens and a parabolic reflector.

With signal systems embodying any of these optical arrangements, I incorporate a lighting means having at least two filaments and which is preferably in the form of a lamp as shown and described in my copending application Serial No. 603,627, filed April 6, 1932.

Where in accordance with this invention a plurality of filaments are utilized, one screened from the other, in combination with an optical system having a colored signal area, should one filament burn out, there will be presented on the signal area a luminous segment of different contour from the normal signal area, but of the same color, and an adjacent spot also of different contour from the normal signal area and of a different or darker color from the normal signal area. The importance of having a signal providing maximum light visibility and intensity will therefore be appreciated as it materially enhances the safety factor.

In other words, the present invention will produce a signal having a normal signal area indication but when the means for producing that normal signal indication partially fails, a spot will be produced on the signal area to give a definite indication that something is wrong without, however, interfering with the signal indication intended to be given.

The present invention utilizes a plurality of filaments and an interposed screen in association with the optical system, whereby should one filament fail, the other will remain incandescent and the signal area will visibly present a bright portion of definite contour to give the intended signal and a darker portion of definite contour to indicate that something is wrong. The corrugations of the lens are, for example, vertically disposed with a lamp horizontally positioned so that the filament or filaments are present vertically and in parallel with relation to the corrugations. Thus, a large number of beams constituting substantially the major portion of the reflected light and which are reflected at an angle to the lens by the parabolic reflector, are bent and directed by the corrugated area in a straight line parallel to the axis of the optical system, i. e., to the horizontal; those beams which may be reflected at such an angle that they cannot be thus straightened, are refracted so as to be visible when viewing the lens at an angle. Thus, all of the beams are efficiently employed to give an intense or positive and full illumination of the signal area. This is a vital consideration where the filaments are offset, that is, not precisely at the focal point of the optical system as when they are screened in accordance with my Patent 1,889,725 and copending application, Serial No. 614,817, e. g., in a signal adapted to (a) present a full signal indication, and (b) indicate a failure of the illuminating means while simultaneously maintaining the signal operative.

So far as I am aware, no signal system has heretofore been devised to normally give a definite colored signal area through the operations of a plurality of incandescent filaments and when one of those filaments burns out to produce an indicating spot on the signal area in notification of the failure of one of those filaments.

A very important object of the invention is to provide a construction wherein a lamp i. e., the filaments thereof, are permanently and completely electrically connected in parallel so that normally both filaments are incandescent, to fully illuminate the signal area, and should a filament burn out, means in the form of an indicator screen, are provided which are cooperable with the remaining incandescent filament to produce on the signal area a definite signal of similar appearance, but of contrasting contour from the normal signal indication, and a simultaneous and definite notification of the failure of the other filament, in the form of a dark area or spot of contrasting appearance and contour.

In the drawings:

Figure 17 is a sectional view showing the lamp of Figures 9, 11, and 13 positioned in a socket and the manner in which the lamp is maintained in adjusted position with its filaments disposed parallel to the corrugations.

In carrying out the invention, I employ a signal housing having associated therewith one of the usual optical systems such as a lens without a reflector, a lens and reflector, a reflector and cover glass, as well as a system in which both a colored lens and a clear lens are utilized.

The illuminating means employed preferably consist of a plurality of filaments arranged in parallel and I find particularly useful the lamp shown and described in my co-pending application Serial No. 603,627, filed April 6, 1932, Patent No. 1,889,725, April 6, 1932, wherein the filaments are permanently and completely electrically connected in parallel and are associated with an indicator screen.

The lamp shown in said application consists of two filaments and an interposed screen which may be of opaque material such as polished metal; of slightly translucent material such as dense mica, or of transparent material such as dark glass.

It is preferably, however, made opaque or slightly translucent.

Figures 1, 5, 6:
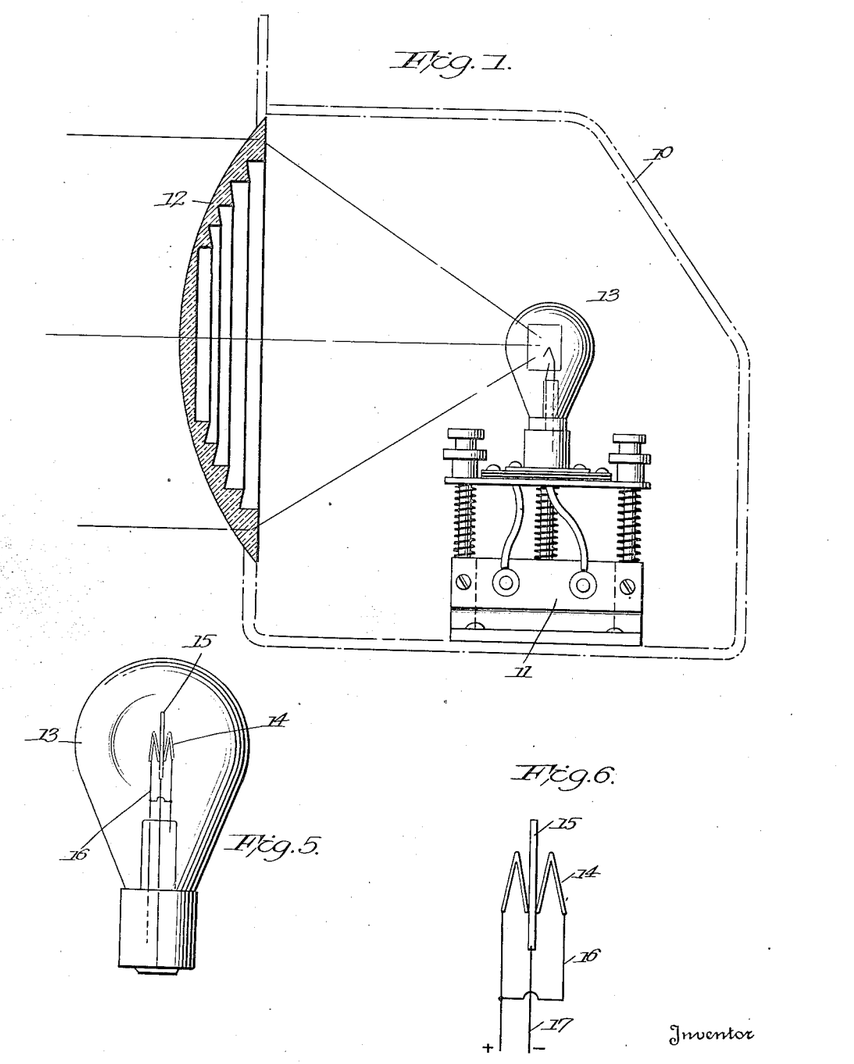
Figure 1 is a vertical showing of a housing and colored lens with a lamp positioned within the housing.
Figure 5 is an end view of a lamp employed with the present invention.
Figure 6 is a detail view of the screen and associated filaments of the lamp of Figure 5.

Referring to the drawings, Figure 1 shows a signal housing and associated optical system, wherein 10 indicates the housing, 11 the means for supporting and positioning the lamp and 12 the lens. With such a construction a reflector will not be employed. This arrangement is usually used for night lighting of colored semaphore roundels.

The lamp 13 is preferably one constructed generally in accordance with Figures 5, 6, 7, and 8, wherein the indicator screen 15 is made of metal and constitutes the electrical ground or common.

It is to be observed that the input wires 16 are disposed in parallel and the ground wire is connected to the screen or common as shown at 17.

In the constructions shown in Figures 5 to 8, the filaments 14 are substantially V-shaped and angularly disposed relative to the screen, so that their maximum illuminating effect may be obtained, i. e., presented toward the lens, as shown in my said application.

Figure 7:
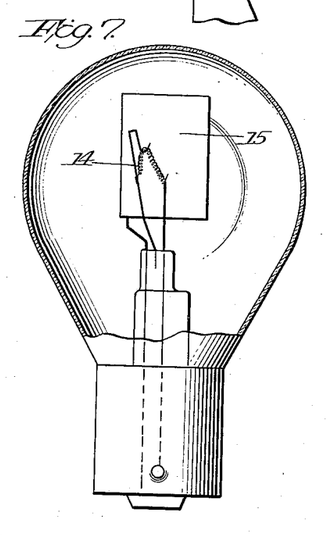
Figure 7 is a side view of a modified form of lamp.

In Figures 5 and 6, the filaments are disposed substantially centrally of the plane surface of the polished metal screen 15, while in Figure 7, they are disposed offset with respect thereto, i. e., adjacent one edge thereof.

Figure 3:
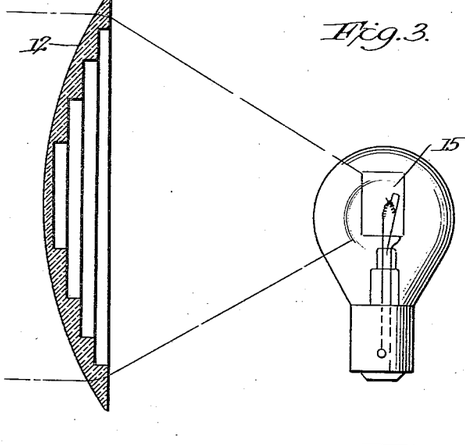
Figure 3 is a sectional view partly diagrammatic showing the arrangement of a lamp and a colored lens, wherein a reflector is omitted as with the construction shown in Figure 1.
Figure 8:
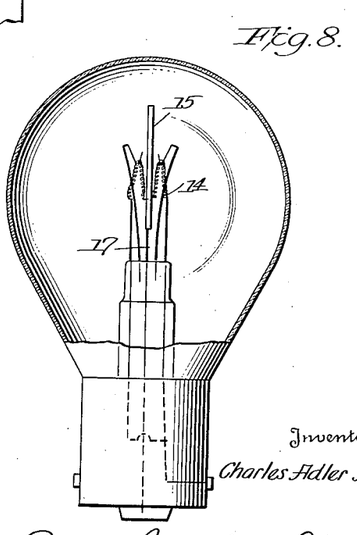
Figure 8 is an end view of the lamp shown in Figure 7.

Referring to Figure 1, where the offset arrangement shown in the lamp of Figures 7 and 8 is employed, such offset portion of the screen will face the clear lens 12, as shown, or a colored lens, as shown in Figure 3. In this manner, where a reflector is not employed and the lamp is disposed vertically, I am enabled when one filament burns out to present on the signal area a bright area or segment as shown at A, in Figure 14, and a darker area, or spot as shown at B. The bright area A, it will be observed, is of different contour from the normal illuminated contour of the signal area defined by the semaphore or lens 12, but is of the same color as the normal signal area. The contour is, however, definite and the area A is substantial in that an effective and appreciable signal indication will be given.

Figure 14:
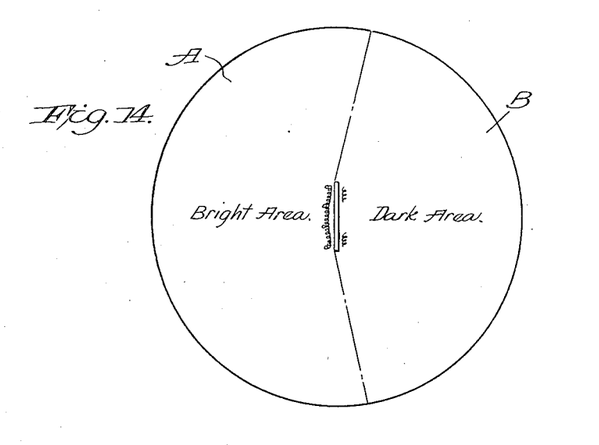
Figure 14 is a diagrammatic view illustrating the bright area and the relatively darker indicating spot obtained when a filament burns out in connection with any of the signals illustrated.
Figure 15:
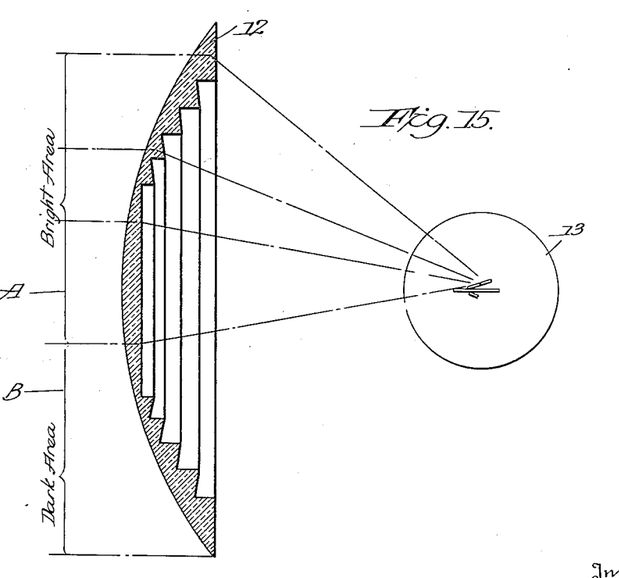
Figure 15 is a diagrammatic view showing the position of the rays in a signal, wherein a lens and a lamp are utilized, but wherein the reflector is not employed.

The adjacent dark spot or area B is likewise of different contour from the normal signal area defined by the lens 12, and, moreover, is of a different color, being usually black. This dark spot or area, as with the area A, is of definite contour and of a size to be substantial, that is, give an observable indication of the failure of a particular filament.

The screen 15 is in alignment with the longitudinal axis of the lamp and the filaments are disposed in close proximity thereto, so that both filaments are as close to the focal point of the optical system as possible. The lamp, of course, is at the focal point of the optical system.

When one filament burns out, the screen cooperates with the optical system to confine rays from the operative filament and cause them to present on the signal area the bright area "A" and simultaneously prevent rays from reaching a definite portion of the signal area B or being reflected to illuminate the area B so as to present the darker area of contrasting contour.

Referring to Figure 14, it will be observed that the filament on the right has burned out and that on the left has remained illuminated. It will be understood that should the filament on the left side of the screen burn out, leaving that on the right illuminated, the respective bright and dark areas will be reversed.

The lamp shown in Figures 5, 6, 7, and 8 is particularly adapted for railroad signals and where in some cases heretofore a two filament lamp has been used, the absence of a screen has rendered it difficult to observe a failure of one filament in that the signal area would still be completely illuminated. With the present construction, however, the definite bright and dark areas are visibly presented and an engineman or signal maintainer can readily observe and report the failure.

Figure 4:
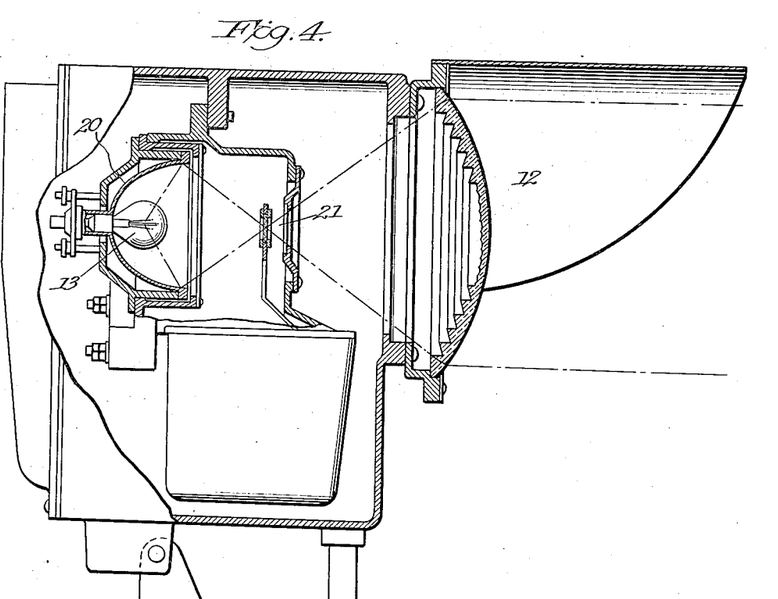
Figure 4 is a sectional view of another system employing a housing in which is arranged an elliptical reflector, a colored roundel and a clear lens.

In Figure 4, I have shown my invention applied to a signal housing utilizing an elliptical reflector 20 and a movable colored glass roundel 21 of conventional structure. The lens 12 is clear, while the roundels are colored red, yellow or green. In this construction, it will be noted that the beams converge and pass through the roundel and then diverge to the lens. I employ a lamp such as shown in Figures 5 to 8 and 11a, or one illustrated in Figures 9, 10, 12, and 13, and the screen is disposed either horizontally or vertically, as shown. By this construction, I am enabled to obtain the bright area or indication as shown in Figure 14 and the adjacent darker spot should one of the filaments burn out.

Figure 2:
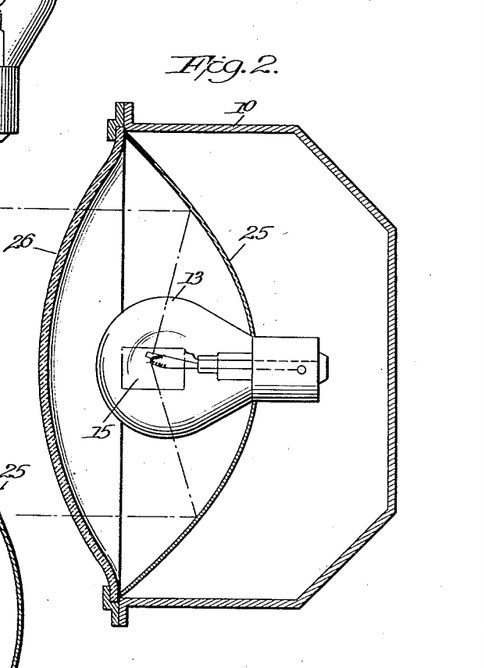
Figure 2 is a sectional view showing a housing, and a reflector and a colored cover glass associated therewith, wherein the lamp is disposed horizontally.

In Figure 2, I have illustrated the usual traffic signal housing 10 wherein a reflector 25 and a colored cover glass 26 are employed. In this construction the lamp is disposed horizontally and may be of the construction shown in Figures 5 to 8 or Figures 9, 10, 12, and 13. Where a reflector is employed, of the parabolic type such as that shown at 25, the screen is vertically disposed and in each of the lamps extends a sufficient distance to the rear of the filaments to preclude the passage of light from one filament to the opposite side of the screen. That is to say, when one filament burns out, the screen must extend toward the reflector, i. e., be disposed close to the foot of the bulb a sufficient distance to prevent rays which strike the reflector from being projected upon the opposite or burned outside of the screen.

By the construction shown, I am likewise enabled to obtain the bright area or spot shown in Figure 14 and the adjacent darker indicating area.

Figure 2A:
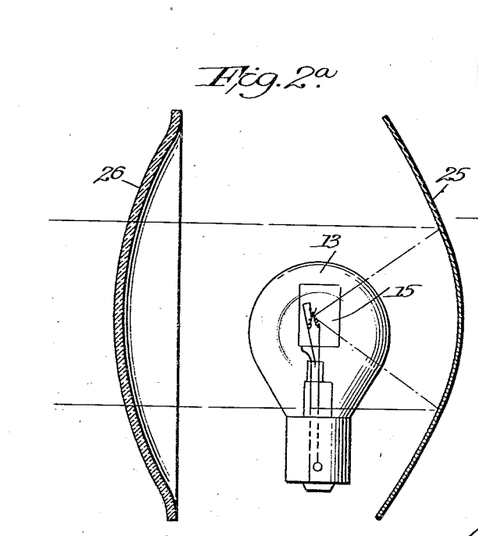
Figure 2a is a sectional view showing a system, wherein a parabolic reflector and a colored cover glass are employed with the lamp disposed vertically.

In Figure 2a, I have illustrated a reflector 25 and a colored cover glass 26 wherein the lamp is vertically disposed. In such a construction the offset portion of the screen faces the reflector, so as to preclude the reflection of light on the burned outside of the screen. The reflector 25 is parabolic.

Figures 11, 12, 13:
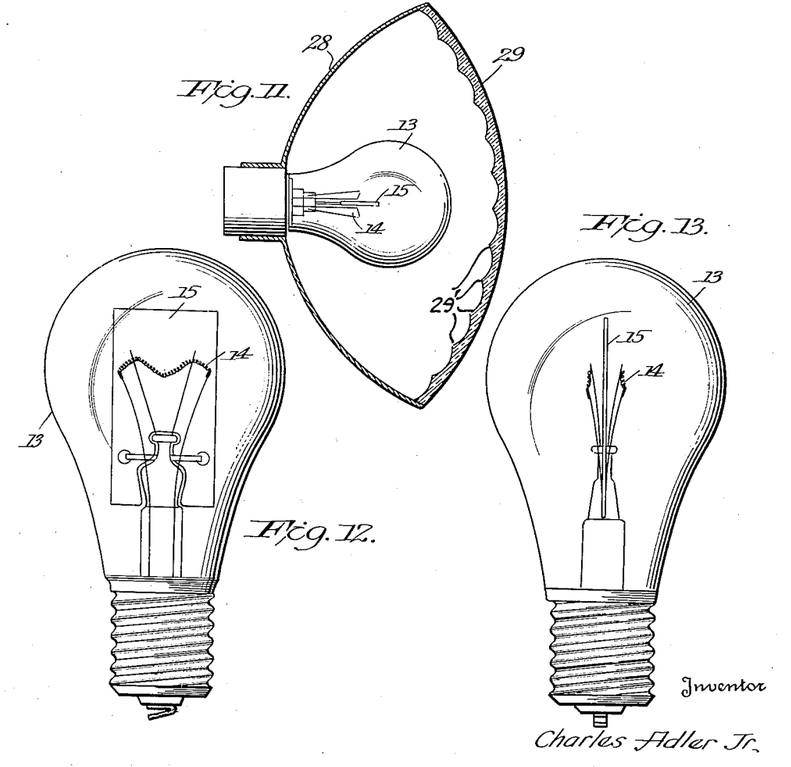
Figure 11 is a top view of a system employing a reflector and a lens, the lens being provided with vertically extending corrugations.
Figure 12 is a side elevation of a lamp substantially similar to that of Figure 9.
Figure 13 is an end elevation of the lamp shown in Figure 12.
Figures 11, 11A, 11B:
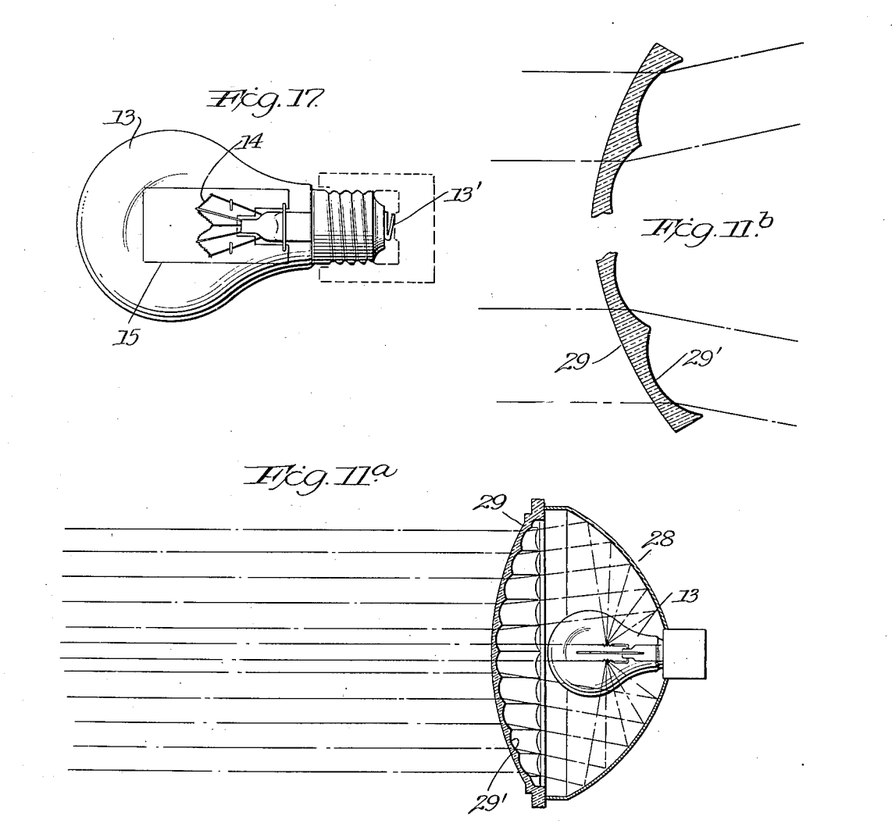
Figure 11a is a view similar to Figure 11 showing the manner in which the light rays are reflected and bent or directed by the corrugations of the lens.
Figure 11b is a sectional view partly broken away showing in detail the manner in which the direction of the reflected light beams is altered by the corrugations of the lens.

In Figure 11, I have illustrated a reflector 28 and a colored lens 29 having vertical, i. e. parallel corrugations 29'. With this construction, I preferably employ a lamp as shown in Figures 9, 10, 12, and 13, although I may employ a lamp as constructed in Figures 5, 6, 7, and 8. I prefer to use a lamp as shown in Figure 12 and dispose the same horizontally as shown in Figures 11 and 11a. In this position, as illustrated in Figures 11 and 11c, the filaments 14 are vertically disposed in parallel relation with the corrugations 29'.

Figure 11C:
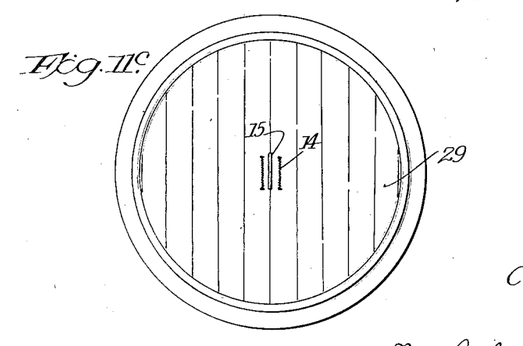
Figure 11c is a front elevation of the organization shown in Figures 11 and 11a showing the offset disposition of the filaments in the optical system and the elongated presentation of the filaments in parallel relation with the corrugations of the lens.

The lamp in this construction is disposed horizontally and as shown in Figures 12 and 11a, the screen extends a sufficient distance rearwardly to the foot of the bulb to preclude the reflection of light upon the burned out side of the screen, by the parabolic reflector 28; likewise the filaments 14 of the lamp 12 are vertically disposed as shown in Figure 11c so as to be parallel with relation to the corrugations 29'. In this manner, since the filament or filaments are slightly offset with respect to the focal point of the reflector by reason of the screen, certain of the beams are reflected by the reflector at such an angle to the lens as to strike the corrugations as shown in detail in Figure 11b and are thereby bent or straightened so that they pass through the lens in parallel relation to each other and at substantially right angles to the filaments. That is to say, the angle of reflection of certain of the beams is such that upon reaching the corrugations of the lens, the direction of the beams is changed by reason of the contour of the corrugations acting to refract and straighten the beams so that they pass through the lens at substantially right angles to the vertical or parallel to the horizontal. Those beams which have an angle of reflection which do not permit of their direction being changed in this manner, are diffused by the lens. Thus, all of the light is efficiently used to produce an intense and brilliantly illuminated signal either when (1) both filaments are illuminated, or (2) when only one filament is energized as in the case of a failure. Since the greater portion of the reflected light has an angle of reflection permitting it to be refracted and straightened to pass through the lens at right angles to the optical system or to the filaments as shown in Figures 11a and 11b, the cooperation between the fluted or corrugated lens and the reflector and the lighting means will be appreciated.

As shown in Figure 11, the lamp is disposed horizontally with the filaments 14 and screen 15 disposed vertically substantially in parallel relation with the vertically disposed or parallel flutes 29', the screen being in focus with the reflector and the filaments presented in slightly offset relation to the focal point of the reflector. This correct adjusted position of the filaments relative to the lens is assured by the provision of means 13' in the form of a resilient contact. This contact is preferably carried by the base of the lamp as shown in Figures 12 and 17. This resilient contact means is active in any case where the lamp and fitting are not accurately machined. Thus, in some cases, if the lamp were screwed entirely home, the screen and filaments would not be presented in parallel relation to the corrugations. Hence, under these circumstances with the present invention, the lamp will be screwed as far as possible into the socket and until a point is reached where the screen and filaments are presented in parallel relation to the corrugations. This is a vital consideration, since there are very often inequalities in the fitting between the lamp socket and the base, and the present invention will rigidly maintain the lamp in its correct adjusted position.

It will be observed that the filaments are elongated, and that these elongated portions, as well as the adjacent free end of the screen are presented to the corrugations of the lens and in substantially parallel relation thereto. Moreover, it will be noted that the corrugated lens affords a plurality of thickened parallel portions defined by the grooves or furrows of the corrugations, the distance between each thickened portion being curved. The efficiency of the present signal is materially enhanced by the provision of the corrugated lens which cooperates with the parabolic reflector and with the offset filaments to efficiently employ all of the light and produce the very advantageous results described. The discovery is particularly vital and valuable in the case of a signal adapted, as in the present application, to fully illuminate the signal area, but, in event of failure, to maintain the signal operative and simultaneously give an indication of the failure.

Figure 9:
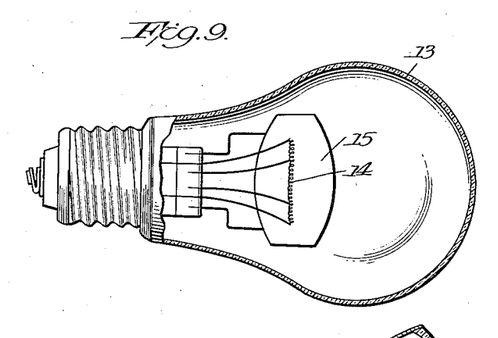
Figure 9 is a side view of another type of lamp, particularly that illustrated in my aforesaid co-pending application.
Figure 10:
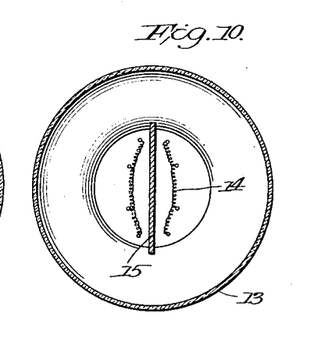
Figure 10 is a top view of the lamp of Figure 9.

Referring to Figure 12, the screen is preferably of mica and it is to be noted that while the filaments are in parallel, separate wires are used to form the electrical ground as distinguished from a lamp, wherein the screen is made of metal or conducting material. In Figure 9, I have illustrated a lamp wherein the filaments are disposed substantially centrally of the screen which, however, as in the case of the disclosure in Figure 12, extends a sufficient distance toward the base of the lamp to prevent any beams from an incandescent filament from being reflected on the burned out side of the screen.

The construction shown in Figures 2 and 11 find application in connection with vehicular or pedestrian traffic systems, while the constructions shown in Figures 1 and 4 are particularly useful in connection with railway signals.

In each case, by the provision of a screen and filaments disposed upon opposite sides thereof and in electrical parallel, I am enabled to employ a colored signal area in the form of a semaphore, cover glass or lens and when both filaments are incandescent illuminate the entire signal area. Should a filament fail, however, the other filament will remain incandescent and present on the signal area (1) a signal indication of the same color as the normal signal indication, but of contrasting contour, i. e., an area of less area than the normal illuminated signal area, and (2) an adjacent area B of perceptible darker color from the normal signal indication, as well as from the bright area A and of contrasting contour from the normal signal indication and the bright area A.

In other words, should a filament burn out, definite indicating areas will be presented on the semaphore, cover glass or lens which will be visible and ascertainable by observation, so that while the signal indication will remain effective, notification, likewise, will be given of the burning out of one of the filaments.

Figure 16:
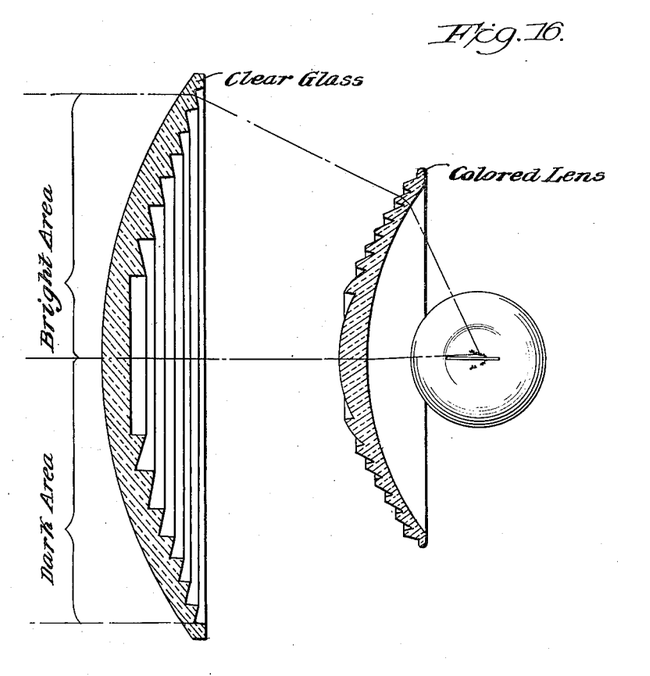
Figure 16 is a diagrammatic view of a system employing a colored lens and a clear lens, the colored lens being disposed between the clear lens and the lamp.

Referring to Figure 16, I have shown an optical arrangement such as is used in signal systems, wherein a colored lens of relatively small diameter is interposed between the lamp and a clear lens of larger diameter. With such a system the present invention is operative to produce the bright indicating area and an adjacent darker area, as shown in Figure 16.

In the appended claims, I have used the term "signal area" and by that, I mean either a semaphore, a colored lens or a colored cover glass or the equivalent, such as will normally present a visible colored indication or signal. I have also used the term "illuminating means" and by that term, I mean any arrangement of a plurality of filaments or equivalent thereof and a screen or equivalent structure, such that when one is extinguished the definite bright and darker areas diagrammatically illustrated in Figure 14 will be presented on the visible signal area.

In referring to a "spot" in the appended claims, I mean an observable area less than the normal signal area defined by the lens or cover glass and which is of a different or darker color from the normal signal indication. Such spot will be visible and of a size to present a satisfactory notification of failure.

It is to be observed that with each of the constructions shown, the screen will be normally inactive, that is to say, when both filaments are incandescent, the screen does not exercise any effect. However, should one of the filaments burn out, the said screen is operable automatically to present the bright segment or area as shown at A, in Figure 14, and the darker area adjacent thereto indicated at B. The screen and incandescent filament will cooperate with the optical system employed to produce these bright and dark areas which are of definite contour and of different appearance from the normal signal indication.

In actual use, the illuminating means will be focused so that the screen is disposed substantially centrally of the reflector or lens or cover glass, as the case may be, and with any of the constructions shown the bright and darker areas will be substantial, i. e., observable, so that should a filament burn out, the situation can be promptly corrected.

As heretofore stated, the screen is preferably disposed in alignment with the longitudinal axis of the lamp and the filaments are arranged as close thereto as possible, so that each thereof will be substantially focused relative to the optical system.

Referring to Figure 3 particularly, where a reflector does not form a part of the optical system, a lamp having the screen offset with respect to the filaments is preferably employed. The screen as shown is disposed vertically and the offset portion faces the lens.

On the other hand, where the construction shown in Figure 2a is employed, namely a reflector and a clear cover glass, the vertically disposed lamp will have the screen likewise arranged vertically with the offset portion facing the reflector.

Where the lamps are disposed horizontally it is desirable that the screens completely mask one side of the filaments, and as shown in Figures 9 and 12, extend a substantial distance back toward the base of the lamp to preclude the possibility of light being reflected upon the burned out side of the screen.

It is, furthermore, to be noted that my invention is operable in connection with a variety of optical systems without the necessity of changing the same and that in each case the lamp can be properly focused to produce the indications shown in Figure 14, in the event one of the filaments burns out.

As shown in the drawings, the screens are supported in each case upon the glass pillar or support associated with the conventional vacuum or gas filled bulb, as set forth in my aforesaid application. The lead in and ground wires are preferably passed through this pillar. They are also disposed far enough apart or suitably insulated to avoid any chance of arcing.

The filaments will be of equal capacity or, if desired, one constructed to have a longer life than the other.

The screens are preferably centrally disposed with respect to the bulb and are in alignment with the longitudinal axis of the lamp.

The size of the screens will be varied but they are of an area, i. e., transversely and longitudinally, to mask the filaments. They extend, with respect to the filaments, a sufficient distance toward the tip of the bulb to produce the effect shown in Figure 14, and toward the pillar or foot to prevent reflection on the burned out side as herein explained.

The screens are positioned in substantial alignment with the focal point of the optical system and the filaments are disposed in parallel planes as close as possible thereto, as well as electrically connected in parallel.

The screens are substantially rectangular but may be of any desired shape as will produce the effect obtained by this invention in connection with the optical system and colored signal area.

I claim:

1. A signal having in combination a lens constituting a signal area, illuminating apparatus therefor including a plurality of filaments electrically connected in parallel and substantially at the focus of said lens, and a screen between said filaments disposed in rear of and spaced a substantial distance from the signal area and cooperating with said filaments and signal area and permitting unobstructed illumination of the signal area when each filament is energized, said screen when one of said filaments burns out cooperating with the remaining filament and confining a portion only of the light from said remaining energized filament to produce a substantial bright area and a smaller but visible darker spot on the signal area.

2. A signal having in combination a lens constituting a signal area, illuminating apparatus therefor including a plurality of filaments electrically connected in parallel and one of which is substantially at the focus of said lens, and a screen between said filaments disposed in rear of and spaced a substantial distance from the signal area and cooperating with said filaments and signal area and permitting unobstructed illumination of the signal area when each filament is energized, said screen when one of said filaments burns out cooperating with the remaining filament and confining a portion only of the light from said remaining energized filament to produce a substantial bright area and a smaller but visible darker spot on the signal area.

3. A signal having in combination a cover glass constituting a signal area, a reflector, illuminating apparatus between the signal area and reflector including a plurality of filaments electrically connected in parallel and one of which is substantially at the focus of said reflector, and a screen between said filaments disposed in rear of and spaced a substantial distance from the signal area and cooperating with said filaments and signal area and permitting unobstructed illumination of the signal area when each filament is energized, said screen when one of said filaments burns out cooperating with the remaining filament and confining a portion only of the light from said remaining energized filament to produce a substantial bright area and a smaller but visible darker spot on the signal area.

4. A signal having in combination a cover glass constituting a signal area, a reflector, illuminating apparatus between the signal area and reflector including a plurality of filaments electrically connected in parallel and substantialy at the focus of said reflector, and a screen between said filaments disposed in rear of and spaced a substantial distance from the signal area and cooperating with said filaments and signal area and permitting unobstructed illumination of the signal area when each filament is energized, said screen when one of said filaments burns out cooperating with the remaining filament and confining a portion only of the light from said remaining energized filament to produce a substantial bright area and a smaller but visible darker spot on the signal area.

CHARLES ADLER, Jr.